(12) United States Patent
Cavallo et al.

(10) Patent No.: US 10,891,335 B2
(45) Date of Patent: Jan. 12, 2021

(54) ENHANCED EXPLORATION OF DIMENSIONALLY REDUCED DATA

(71) Applicant: INTERNATIONAL BUSINESS MACHINES CORPORATION, Armonk, NY (US)

(72) Inventors: Marco Cavallo, New York, NY (US); Cagatay Demiralp, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 15/860,719

(22) Filed: Jan. 3, 2018

(65) Prior Publication Data

US 2019/0205478 A1 Jul. 4, 2019

(51) Int. Cl.
*G06F 16/901* (2019.01)
*G06F 17/18* (2006.01)
(Continued)

(52) U.S. Cl.
CPC .......... *G06F 16/9024* (2019.01); *G06F 16/26* (2019.01); *G06F 17/15* (2013.01);
(Continued)

(58) Field of Classification Search
CPC .............. G06F 16/283; G06F 16/2462; G06F 16/9024; G06F 17/18; G06F 17/30563; G06F 17/30592; G06F 17/30867; G06F 17/30958; G06F 17/50; G06F 2111/08; G06F 2217/10; G06F 30/00; G06F 16/285; G06F 16/24575; G06F 16/41; G06F 16/56; G06F 16/583; G06F 16/5854;
(Continued)

(56) References Cited

U.S. PATENT DOCUMENTS 7,120,283 B2 10/2006 Thieret et al.
7,797,320 B2 9/2010 Thomsen
(Continued)

OTHER PUBLICATIONS

Demiralp, Cagatay, "Clustrophile: A Tool for Visual Clustering Analysis", Cornell University Library, Published Online Oct. 5, 2017, <https://arxiv.org/abs/1710.02173/>.
(Continued)

*Primary Examiner* — Shyue Jiunn Hwa
(74) *Attorney, Agent, or Firm* — Dmitry Paskalov (57) ABSTRACT

Methods for enhanced exploration of dimensionally reduced data. The method including: obtaining at least one data set having a plurality of data objects, wherein each data object is characterized by a plurality of numerical features; applying a dimensionality reduction technique to the at least one data set; generating a two-dimensional scatter plot of the at least one data set, wherein each data object in the plurality of data objects corresponds to a data point in a plurality of data points in the scatter plot; and altering at least one numerical feature of a data object in the plurality of data objects, wherein a position of the data point corresponding to the data object is affected in real-time, and wherein the remaining data points in the plurality of data points are unaffected. In addition, the present invention provides another method and computer program product.

17 Claims, 7 Drawing Sheets

(51) Int. Cl.
  G06T 11/20     (2006.01)
  G06F 17/15    (2006.01)
  G06F 17/17    (2006.01)
  G06K 9/00     (2006.01)
  G06F 16/26    (2019.01)

(52) U.S. Cl.
  CPC .............. *G06F 17/17* (2013.01); *G06F 17/18* (2013.01); *G06K 9/00* (2013.01); *G06T 11/203* (2013.01); *G06T 11/206* (2013.01)

(58) Field of Classification Search
  CPC ........ G06F 16/93; G06F 16/951; G06F 17/16; G06F 21/32; G06F 21/6245; G06F 2209/5017; G06F 2209/503; G06F 2209/509; G06F 2209/541; G06F 2209/549; G06F 8/30; G06F 8/35; G06F 8/36; G06F 9/5027
  See application file for complete search history.

(56) References Cited

U.S. PATENT DOCUMENTS

| | | | |
|---|---|---|---|
| 8,064,697 | B2 | 11/2011 | Zhao et al. |
| 8,751,273 | B2 | 6/2014 | Pinto et al. |
| 8,874,477 | B2 * | 10/2014 | Hoffberg ............... G06Q 20/065 705/37 |
| 8,913,905 | B2 | 12/2014 | Shiomichi et al. |
| 8,996,350 | B1 * | 3/2015 | Dub ..................... G06F 16/285 704/1 |
| 9,396,247 | B2 | 7/2016 | Li et al. |
| 2007/0076001 | A1 | 4/2007 | Brand et al. |
| 2011/0246409 | A1 | 10/2011 | Mitra et al. |
| 2014/0337258 | A1 | 11/2014 | Virkar et al. |
| 2016/0259832 | A1 | 9/2016 | Shore et al. |
| 2016/0267688 | A1 | 9/2016 | Sulatycke |
| 2017/0294034 | A1 | 10/2017 | Zhou et al. |
| 2018/0341248 | A1 * | 11/2018 | Mehr ..................... B33Y 50/02 |
| 2019/0122404 | A1 * | 4/2019 | Freeman ................. G06T 7/251 |

OTHER PUBLICATIONS

Liu, Li et al. "Fast Alternating Projection Methods for Constrained Tomographic Reconstruction", PLOS Online Journal, Published Online Mar. 3, 2017 <http://journals.plos.org/plosone/article?id=10.1371/journal.pone.0172938#sec021/>.

Martins, Rafael et al., "Visual Analysis of Dimensionality Reduction Quality for Parameterized Projections", Computers and Graphics, vol. 41, pp. 26-42, Jun. 2014, Elsevier <http://www.sciencedirect.com/science/article/pii/S0097849314000235/>.

Amorim, Elisa et al.,"Facing the High-Dimensions: Inverse Projection With Radial Basis Functions", Computers and Graphics, vol. 48, pp. 35-47, May 2015, Elsevier <http://www.sciencedirect.com/science/article/pii/S0097849315000230/>.

Anonymous, "Proceedings of the ACM SIGKDD 2017 Full-day Workshop on Interactive Data Exploration and Analytics IDEA 2017," Aug. 14, 2017, 85 pages, Halifax, Nova Scotia, CA.

Gabriel, "The biplot graphic display of matrices with application to principal component analysis," Biometrika, 1971, pp. 453-467, vol. 58, No. 3, GB, Retrieved from the Internet: <URL: http://www.ggebiplot.com/Gabriel1971.pdf>.

Jeong, et al., "IPCA: An interactive system for PCA-based visual analytics," Computer Graphics Forum, Jun. 2009, pp. 767-774, vol. 28 (2009), No. 3, DOI: 10.1111/j.1467-8659.2009.01475.x, Blackwell Publishing, Maiden, MA, USA, Retrieved from the Internet: <URL: https://www.researchgate.net/publication/220506453_IPCA_An_interactive_system_for_PCA-based_visual_analytics/citation/download>.

* cited by examiner

ENHANCED EXPLORATION OF DIMENSIONALLY REDUCED DATA

TECHNICAL FIELD OF THE INVENTION

The present invention relates generally to the field of data science and, more particularly, to methods for enhanced exploration of dimensionally reduced data.

BACKGROUND OF THE INVENTION

Dimensionality reduction (DR) is widely used for exploratory data analysis of high-dimensional datasets across domains, from sciences to engineering. DR algorithms automatically reduce the number of dimensions in data while maximally preserving structures, typically quantified as similarities, correlations or distances among data points. This makes visualization of the data possible using conventional spatial techniques. For instance, analysts generally use scatter plots to visualize the data after reducing the number of dimensions to two, encoding the reduced dimensions in a two-dimensional position. However, dynamically reasoning about results of a dimensionality reduction is difficult. Dimensionality reduction algorithms use complex optimizations to reduce the number of dimensions of a dataset. New dimensions often lack clear relation to the initial data dimensions, limiting the interpretability of the new dimensions.

SUMMARY OF THE INVENTION

According to an embodiment of the present invention, a method for enhanced exploration of dimensionally reduced data is provided. The method includes: obtaining at least one data set having a plurality of data objects, wherein each data object is characterized by a plurality of numerical features; applying a dimensionality reduction technique to the at least one data set; generating a two-dimensional scatter plot of the at least one data set, wherein each data object in the plurality of data objects corresponds to a data point in a plurality of data points in the scatter plot; and altering at least one numerical feature of a data object in the plurality of data objects, wherein a position of the data point corresponding to the data object is affected in real-time, and wherein the remaining data points in the plurality of data points are unaffected.

According to an embodiment of the present invention, a method for enhanced exploration of dimensionally reduced data is provided. The method includes: obtaining at least one data set having a plurality of data objects, wherein each data object is characterized by a plurality of numerical features; applying a dimensionality reduction technique to the at least one data set; generating a two-dimensional scatter plot of the at least one data set, wherein each data object in the plurality of data objects corresponds to a data point in a plurality of data points in the scatter plot; and altering the position of at least one data point in the plurality of data points in the scatter plot, wherein at least one numerical feature of the data object corresponding to the at least one data point is affected in real time, and wherein the remaining data points in the plurality of data points are unaffected.

According to an embodiment of the present invention, a computer program product enhanced exploration of dimensionally reduced data is provided. The computer program product includes: a computer usable storage medium having program instructions embodied therewith, wherein the readable storage medium is not a transitory signal per se, the program instruction executable by a computer to cause the computer to perform a method including: obtaining at least one data set having a plurality of data objects, wherein each data object is characterized by a plurality of numerical features; applying a dimensionality reduction technique to the at least one data set; generating a two-dimensional scatter plot of the at least one data set, wherein each data object in the plurality of data objects corresponds to a data point in a plurality of data points in the scatter plot; and altering at least one numerical feature of a data object in the plurality of data objects, wherein a position of the data point corresponding to the data object is affected in real-time, and wherein the remaining data points in the plurality of data points are unaffected.

DETAILED DESCRIPTION OF THE PREFERRED EMBODIMENTS

Some preferred embodiments will be described in more detail with reference to the accompanying drawings, in which the preferred embodiments of the present invention have been illustrated. However, the present invention can be implemented in various manners, and thus should not be construed to be limited to the embodiments disclosed herein. On the contrary, those embodiments are provided for the thorough and complete understanding of the present invention, and to completely convey the scope of the present invention to those skilled in the art.

Embodiments of the present invention recognize dimensionality reduction methods are driven by complex numerical optimizations, which can make dynamic reasoning about dimensionally reduced results difficult. Data analysts with limited experience in dimensionality reduction frequently have issues discerning how the projection axes and the position of data points on a dimensionally reduced scatter plot correlate with the original, higher dimensional data. As a result, dimensionality reduction methods are often viewed as black boxes and common scatter-plot visualizations are treated as static images. Consequently, enabling data analysts to not only probe the results of dimensionally reduced data, but also actively manipulate them is highly sought after to increase the efficacy of using dimensionality reduction in exploratory data analysis.

Embodiments of the present invention provide methods and a computer program product for enhancing exploration of dimensionally reduced data, enabling a data analyst to run various input and output scenarios to see how the dimensionality reduction technique affects the original, higher dimensional data.

More specifically, the present invention provides a method for enhanced exploration of dimensionally reduced data. The method includes obtaining at least one data set having a plurality of data objects, wherein each data object is characterized by a plurality of numerical features. Then, applying a dimensionality reduction technique to the at least one data set and generating a two-dimensional scatter plot of the at least one data set, wherein each data object in the plurality of data objects corresponds to a data point in a plurality of data points in the scatter plot. Thereafter, the method teaches altering at least one numerical feature of a data object in the plurality of data objects, wherein a position of the data point corresponding to the data object is affected in real-time, and wherein the remaining data points in the plurality of data points are unaffected.

In addition, the method teaches selecting a data point in the plurality of data points in the scatter plot; and generating a projection line for each numerical feature of the data object corresponding to the data point, wherein a length of each projection line indicates an importance of each numerical feature on the position of the data point, and wherein altering a numerical feature affects the position of the data point along the projection line corresponding to the numerical feature. The projection line can be generated by calculating the mean, standard deviation, minimum value and maximum value for each numerical feature; and plotting the projection line with a range from the minimum value to the maximum value and a step size of $c\sigma_i$.

Any dimensionality reduction technique known to one of ordinary skill in the art can be used such as principal component analysis, linear discriminant analysis, generalized discriminant analysis, or autoencoder based dimensionality reduction.

An autoencoder is an artificial neural network model that can learn a low-dimensional representation (or encoding) of data in an unsupervised fashion. Autoencoders that use multiple hidden layers with non-linear activation functions can discover nonlinear mappings between high-dimensional datasets and their low-dimensional representations. Unlike many other dimensionality-reduction methods, an autoencoder gives mappings in both directions between the data and low-dimensional spaces. Embodiments of the present invention teach compute forward projection (discussed below) by performing an encoding pass on the trained autoencoder for a user-modified input. In addition, to compute backward projection (discussed below), embodiments of the present invention teach performing a decoding pass on the autoencoder for the user-changed output projection.

Embodiments of the present invention also provide a method for enhanced exploration of dimensionally reduced data. The method includes obtaining at least one data set having a plurality of data objects, wherein each data object is characterized by a plurality of numerical features. Then, applying a dimensionality reduction technique to the at least one data set and generating a two-dimensional scatter plot of the at least one data set, wherein each data object in the plurality of data objects corresponds to a data point in a plurality of data points in the scatter plot. Thereafter, the method teaches altering the position of at least one data point in the plurality of data points in the scatter plot, wherein at least one numerical feature of the data object corresponding to the at least one data point is affected in real time, and wherein the remaining data points in the plurality of data points are unaffected.

Furthermore, the method teaches selecting a data point in the plurality of data points in the scatter plot, setting a constraint on at least one numerical feature of the data object corresponding to the data point; and generating a shaded area in the scatter plot that would not maintain the constraint on the at least one numerical feature.

Embodiments of the present invention also teach a computer program product for enhanced exploration of dimensionally reduced data. The computer program product includes a computer usable storage medium having program instructions embodied therewith, wherein the readable storage medium is not a transitory signal per se, the program instruction executable by a computer to cause the computer to perform a method. The method includes obtaining at least one data set having a plurality of data objects, wherein each data object is characterized by a plurality of numerical features. Then, applying a dimensionality reduction technique to the at least one data set and generating a two-dimensional scatter plot of the at least one data set, wherein each data object in the plurality of data objects corresponds to a data point in a plurality of data points in the scatter plot. Thereafter, the method teaches altering at least one numerical feature of a data object in the plurality of data objects, wherein a position of the data point corresponding to the data object is affected in real-time, and wherein the remaining data points in the plurality of data points are unaffected.

In addition, the method teaches selecting a data point in the plurality of data points in the scatter plot; and generating a projection line for each numerical feature of the data object corresponding to the data point, wherein a length of each projection line indicates an importance of each numerical feature on the position of the data point, and wherein altering a numerical feature affects the position of the data point along the projection line corresponding to the numerical feature. The projection line can be generated by calculating the mean, standard deviation, minimum value and maximum value for each numerical feature; and plotting the projection line with a range from the minimum value to the maximum value and a step size of $c\sigma_i$.

Embodiments of the present invention will now be described in detail with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. For the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 1A:
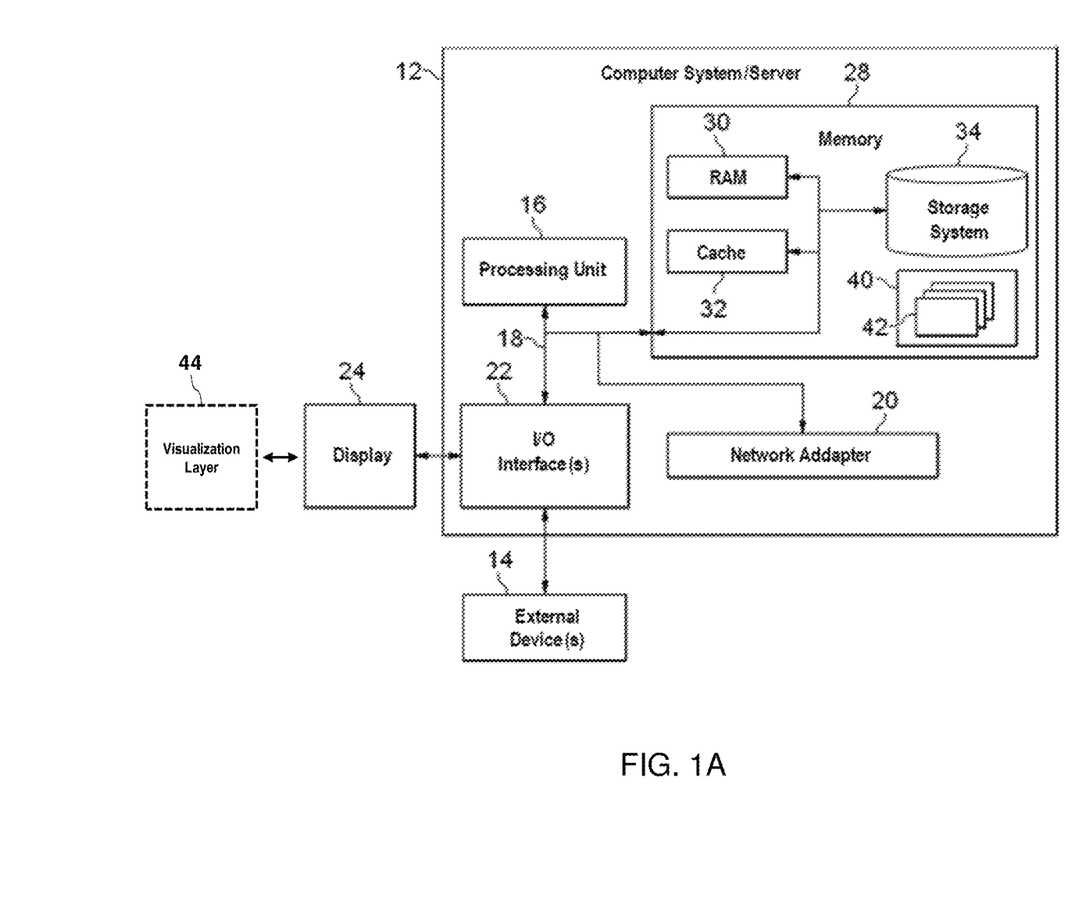
FIG. 1A schematically depicts an exemplary computer system/server which is applicable to implement the embodiments of the present invention.

Referring now to FIG. 1A, a schematic of an example of a cloud computing node is shown. Cloud computing node 10 is an example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and allocated cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1A, computer system/server 12 in cloud computing node 10 is shown in the form of a general-purpose computing device. The components of computer system/server 12 can include, but are not limited to, at least one processor or processing units 16, a system memory 28, and a bus 18 that couples various system components including system memory 28 to processor 16.

Bus 18 represents at least one of any several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Furthermore, at least one external device 14 and a display 24 that enable a user to interact with computer system/server 12 is carried out via a visualization layer 44 that receives direct user input from the at least one external device 14 and provides a result visually via display 24. Visualization layer 44 can be used to implement various embodiments of the present invention.

Figure 1B:
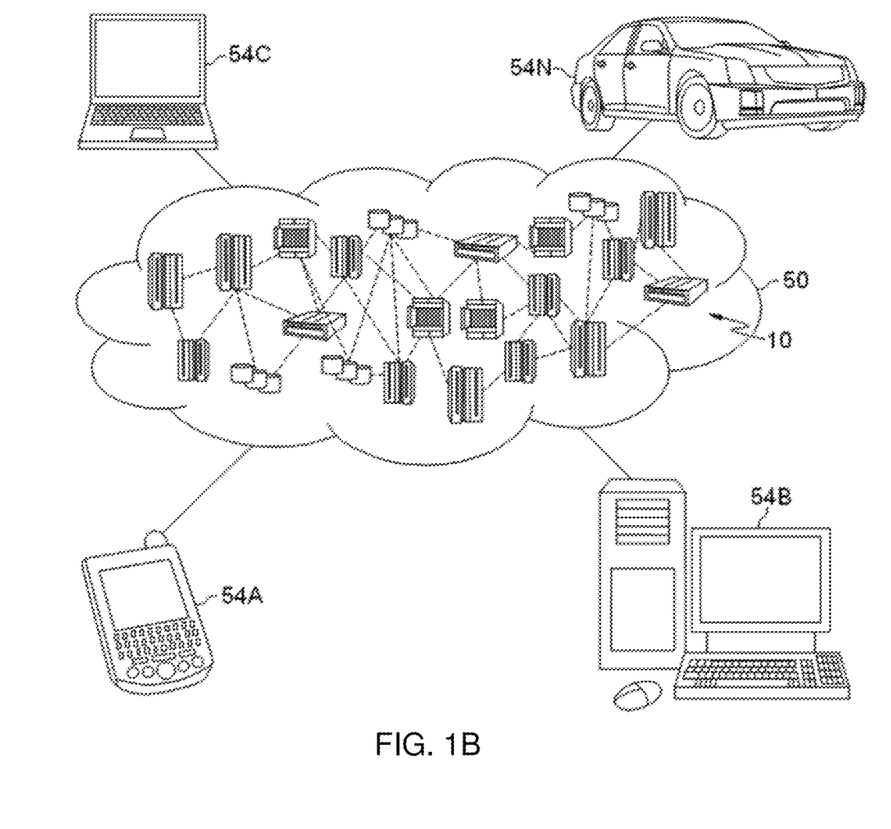
FIG. 1B schematically depicts an exemplary cloud computer environment.

Referring now to FIG. 1B, an illustrative cloud computing environment 50 is depicted. As shown, the cloud computing environment 50 includes one or more cloud computing nodes 10 with which local computing devices used by cloud consumers can communicate. The local computing devices can be, for example, personal digital assistant (PDA) or cellular telephone 54A, desktop computer 54B, laptop computer 54C, and/or automobile computer system 54N. The cloud computing nodes 10 can communicate with one another. The cloud computing nodes 10 can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 2:
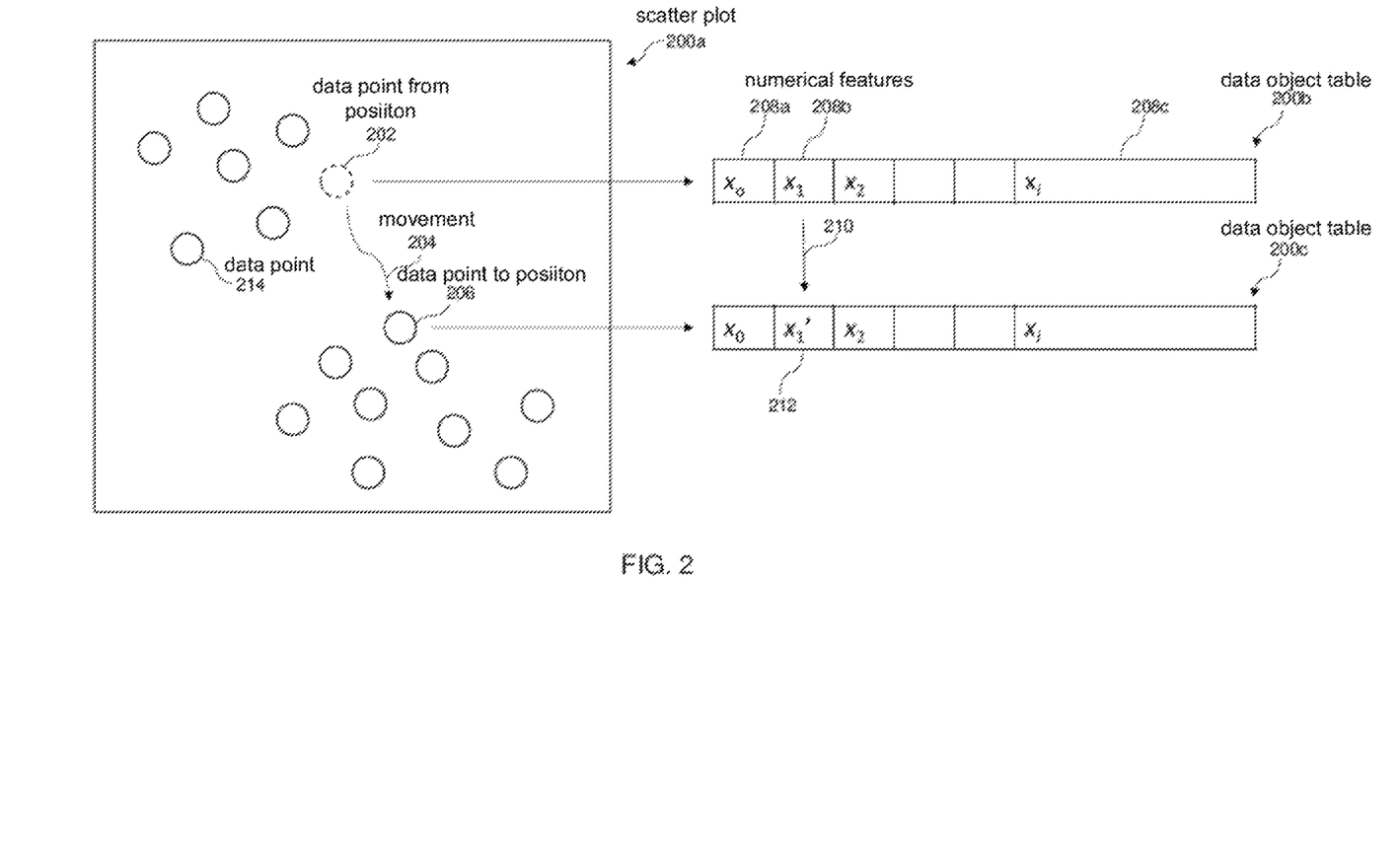
FIG. 2 schematically illustrates a forward projection method for enhanced exploration of dimensionally reduced data according to an embodiment of the present invention.

Referring now to FIG. 2, an illustration of a forward projection method of enhanced exploration of dimensionally reduced data according to an embodiment of the present invention is shown. FIG. 2 shows scatter plot 200a having a plurality of dimensionally reduced data points 214. In scatter plot 200a, a data point having position 202 corresponds to data object table 200b having a plurality of numerical features $x_0$, $x_1$, $x_i$ (see 208a, 208b, 208c). When the value of numerical feature $x_1$ 208b is altered (shown by arrow 210) to numerical feature $x_1'$ 212, the change that occurs in scatter plot 200a can be seen by the movement 204 of the corresponding data point from position 202 to position 206. Note that in data object table 200c containing numerical feature $x_1'$ 212, the numerical features 208a, 208c remain the same.

The forward projection method allows a data analyst to interactively alter data attributes input (data object tables 200b, 200c) into a dimensionality reduction routine and observe the effects in the output (scatter plot 200a). Forward projection is determined using out-of-sample extension or extrapolation. Out-of-sample extension is the projection of a new data point into an existing dimensionality reduction using only the properties of the already computed dimensionality reduction.

The use of out-of-sample extension as opposed to re-running dimensionality reduction on the entire data set is for two reasons. First, out-of-sample extension allows for scalability because it is much faster than re-running the dimensionality reduction resulting in a sustained interactive experience. Second, out-of-sample extension preserves the constancy of the scatter plot representation. For example, if dimensionality reduction was re-run with new data (i.e., a numerical feature change as described above), the resulting scatter plot of dimensionally reduced data would be significantly altered, even though the original inter-data point similarities remain unchanged.

Figure 3A:
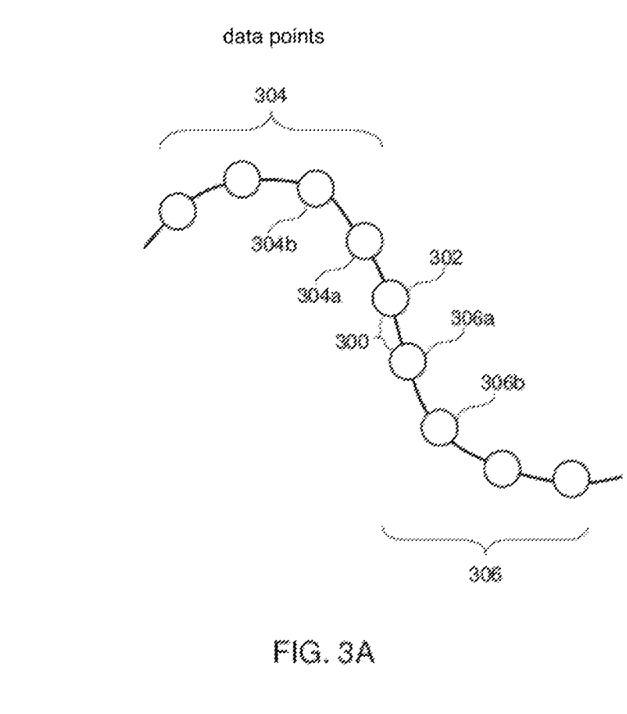
FIG. 3(a) schematically illustrate how projection lines (hereinafter, "prolines") are calculated in a forward projection method for enhanced exploration of dimensionally reduced data according to an embodiment of the present invention.

Referring now to FIG. 3A, an illustration of how prolines are calculated in a forward projection method for enhanced exploration of dimensionally reduced data according to an embodiment of the present invention is shown. FIG. 3A schematically shows distribution information of data point 302 according to forward projection. Here, data points 304 are decreasing values for a given numerical feature of data point 302, whereas data points 306 are increasing values for a given numerical feature of data point 302. This distribution information is used to create a proline (discussed below for FIG. 3B). For data point $x_i$ 302, data points 304 are decreasing values with a step size 300 of $c\sigma_i$ such that data point 304a is $x_i - c\sigma_i$ and 304b is $x_i - 2c\sigma_i$, and so on. In contrast, for data points 306, the value are increasing at the step size 300 of $c\sigma_i$ such that data point 306a is $x_i + c\sigma_i$ and 304b is $x_i + 2c\sigma_i$, and so on.

Figure 3B:
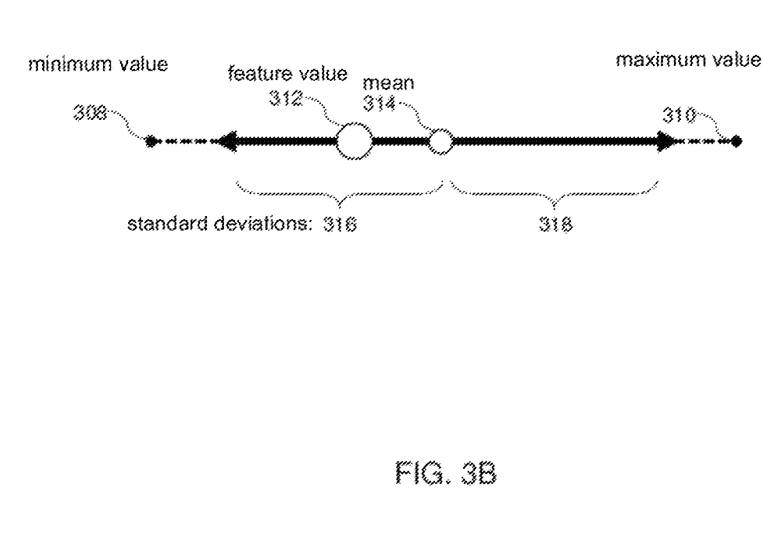
FIG. 3(b) schematically illustrates how prolines are generated in a forward projection method for enhanced exploration of dimensionally reduced data according to an embodiment of the present invention.

In FIG. 3B, as indicated above, a diagram of a proline is shown. In order to create a proline, let $x_i$ 312 be the value of the ith feature for the data point x, then computer the mean $\mu_i$ 314, the standard deviation $\sigma_i$ 316, 318 (316 shows decreasing values, 318 shows increasing values), the minimum value 308 and the maximum value 310. The path is then computed by iterating the values over the range (the range is from the minimum to maximum values) with a step size of $c\sigma_i$. In addition to providing an advanced snapshot of forward projections, a proline also conveys the relationship between the feature distribution and the projection space.

Figure 4:
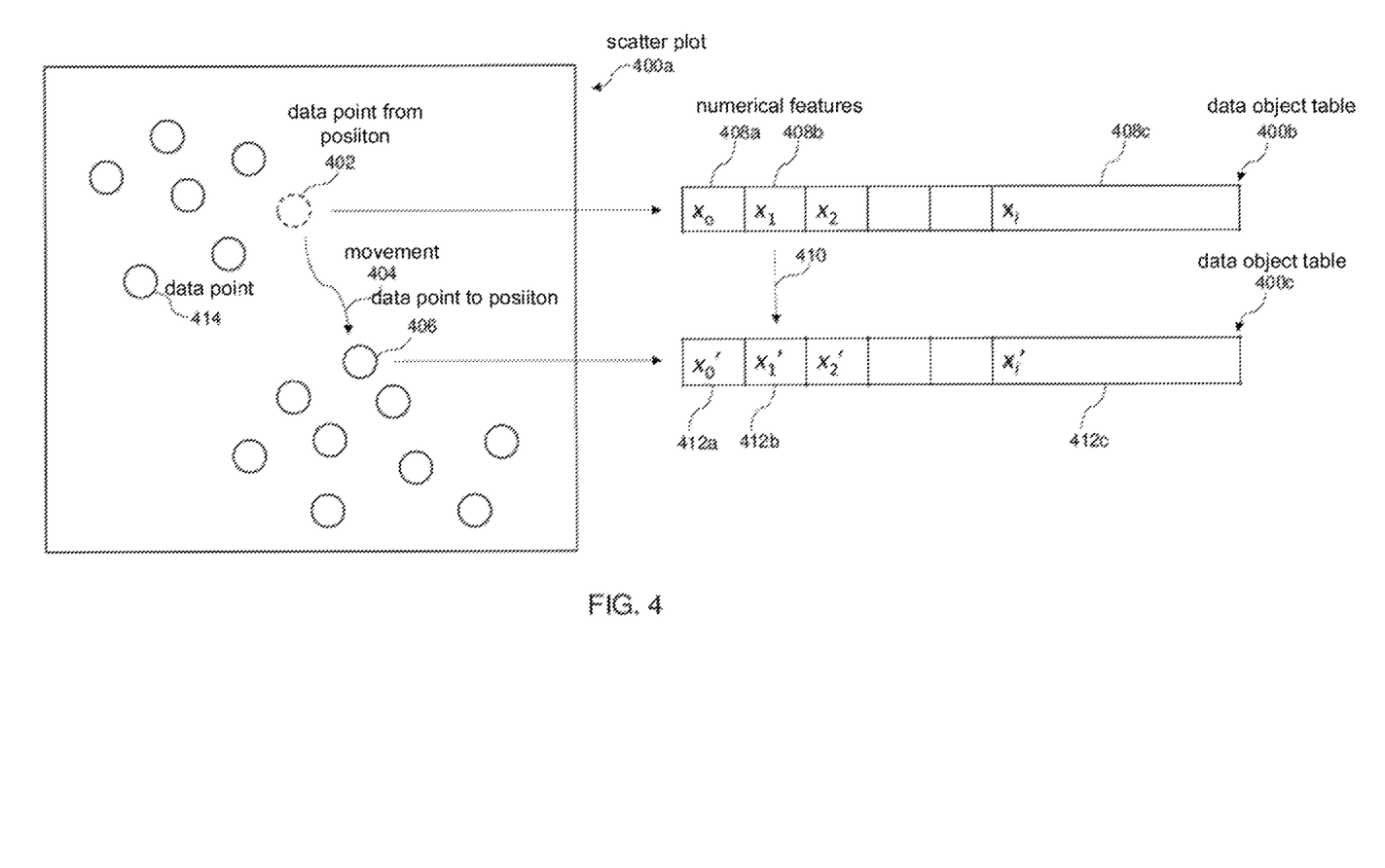
FIG. 4 schematically illustrates a backward projection method for enhanced exploration of dimensionally reduced data according to an embodiment of the present invention.

Referring now to FIG. 4, a diagram illustrating a backward projection method of enhanced exploration of dimensionally reduced data according to an embodiment of the present invention is shown. FIG. 4 shows scatter plot 400a having a plurality of dimensionally reduced data points 414. In scatter plot 400, a data point having position 402 corresponds to data object table 400b having a plurality of numerical features $x_0$, $x_1$, $x_i$ (see 408a, 408b, 408c). When position 402 of the data point is altered along path 404 to position 406, the change that occurs to the values of data object table 408b can be seen in data object table 408c as shown by the plurality of numerical features $x_0'$, $x_1'$, $x_i'$ (see 412a, 412b, 412c). Note that in data object table 400c having the plurality of numerical features $x_0'$, $x_1'$, $x_i'$ (see 412a, 412b, 412c), not all numerical feature.

The backward projection method complements forward projection by enabling the ability to interactively change output attributes and observe how the input attributes change. For instance, if a data analyst notices a single point projected far from a cluster, while forward projection would allow the analyst to change numerical features in an attempt to bring the outlier closer to the cluster, it would be more intuitive to simply move the outlying data point toward the cluster and observe how the numerical features are altered.

Generally, backward projection maps a low-dimensional data point back into the original high-dimensional data space. For linear dimensionality reductions, backward projection is typically done by applying the inverse of the learned linear dimensionality reduction mapping. For non-linear dimensionality reductions, earlier research proposed dimensionality reduction-specific backward-projection techniques. For example, LAMP (inverse Linear Affine Multi-dimensional Projection) introduces a backward projection method for LAMP using local neighborhoods and demonstrates its viability over synthetic datasets. Researchers also investigated general backward projection methods based on radial basis functions, treating backward projection as an interpolation problem.

Embodiments of the present invention provide novel methods of backward projection, namely constrained backward projection and unconstrained backward projection. In constrained backward projection, a what-if analysis is enhanced by enabling a data analyst to semantically regulate the mapping into the un-projected high-dimensional data space (see data object tables 408b, 408c of FIG. 4). For instance, if a data object has a numerical feature for "Age", it would not be expected that the value would ever be negative or very large (i.e., over 200), even though such a value could allow for a more optimal solution in an unconstrained backward projection scenario. Therefore, by allowing one or more numerical features to be constrained, a data analyst would be able to reduce the search space for a feasible solution, while also easing the computation burden.

For example, the OECD Better Life dataset contains eight numerical socio-economic development indices of 34 OECD member countries that include the numerical features of: educational attainment, student skills, years in education, life expectancy, self-reported health, life satisfaction, working long hours, and time devoted to leisure. A data analyst studying this data may be interested how certain numerical features would need to change in order to make one country more similar to another country in the dimensionally reduced space. Using the methods of enhanced exploration of dimensionality reduction of the present invention, the data analyst can constrain the numerical value of life expectancy to be between 0 and 100 since a change allowing the value to be a negative number or a very large number may not be useful.

Figure 5:
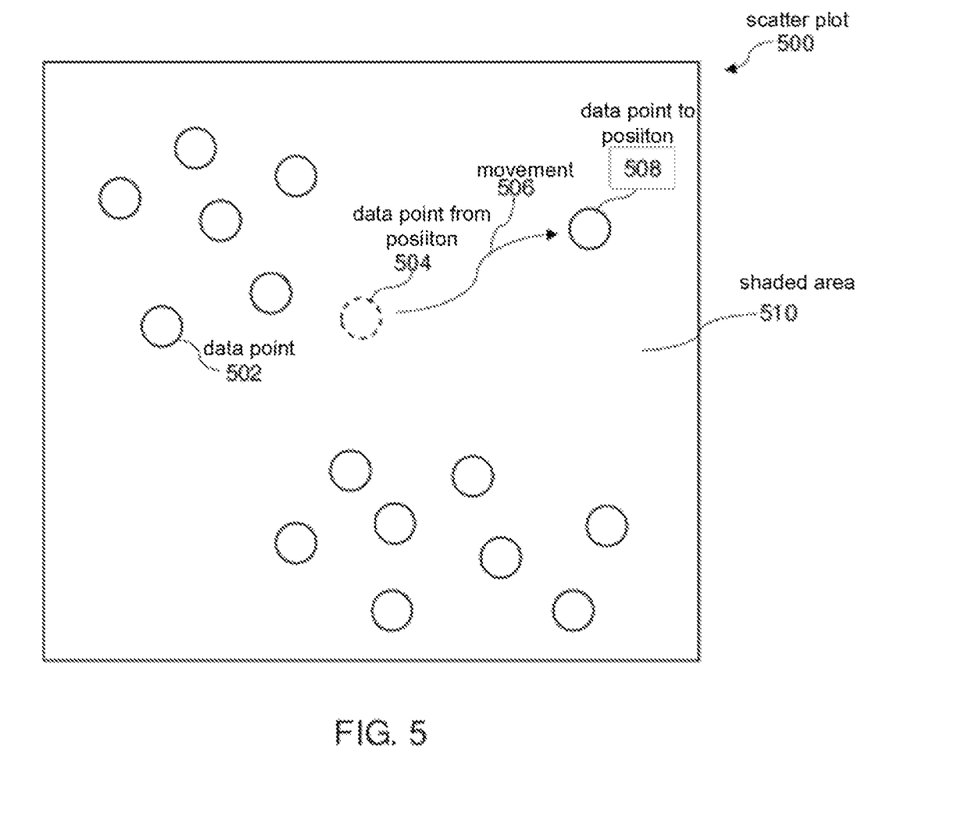
FIG. 5 schematically illustrates a feasibility map for a backward projection method for enhanced exploration of dimensionally reduced data according to an embodiment of the present invention.

Referring now to FIG. 5, a feasibility map for a backward projection method for enhanced exploration of dimensionally reduced data according to an embodiment of the present invention is shown. In FIG. 5, scatter plot 500 contains a plurality of dimensionally reduced data points 502. A data point at position 504 is moved along path 506 to position 508. Shaded area 510 is an indication that a constraint would be broken if the data point at position 504 were moved into the shaded area 510. The diagram in FIG. 5 is an example of a feasibility map, which allows a data analyst to quickly see the feasible space determined by a given set of constraints. Instead of manually checking if a position in the projection plane satisfies the desired range of values (considering both equality and inequality constraints), it is desirable to know in advance which regions of the plane correspond to admissible solutions.

To generate a feasibility map, the projection plane is sampled on a regular grid and the feasibility at each grid point is evaluated based on the constraints imposed by the data analyst, in order to obtain a binary mask over the projection plane. The binary mask is then rendered over the projection as an interpolated grayscale heatmap, where darker areas indicate infeasible planar regions (see shaded area 510 of FIG. 5). With accuracy determined by the number of backward projection samples, a data analyst can see which areas a data point can assume in the projection plane without breaking the constraints.

Figure 6:
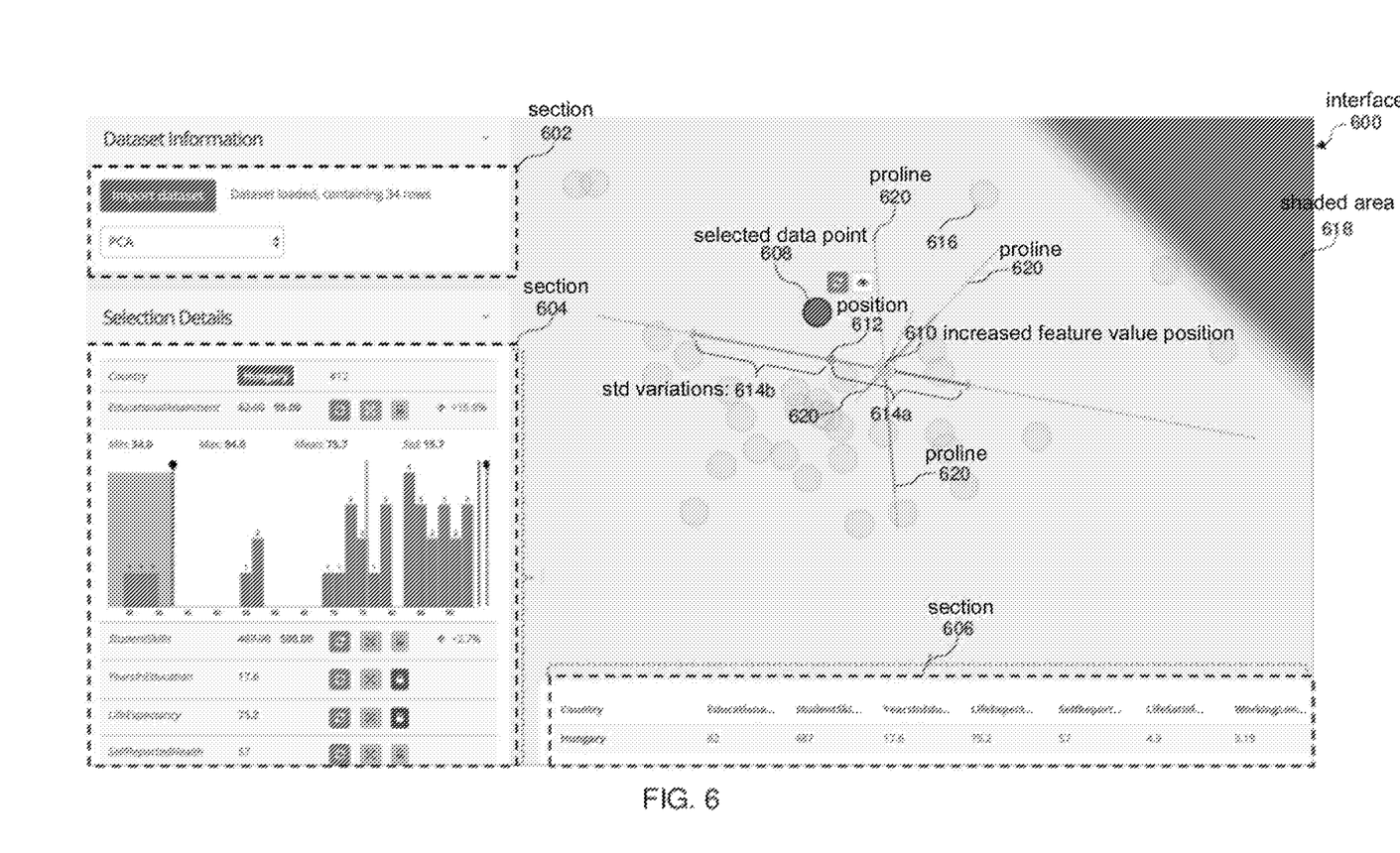
FIG. 6 schematically illustrates an application interface for enhanced exploration of dimensionally reduced data according to an embodiment of the present invention.

Referring now to FIG. 6, a diagram illustrating an application interface for enhanced exploration of dimensionally reduced data according to an embodiment of the present invention. Interface 600 of FIG. 6 is a rendering of a visualization tool used to carry out embodiments of the present invention. Here, in section 602 the data object set can be imported and the dimensionality reduction technique can be chosen. Once imported, dimensionally reduced data points 616 are rendered in the dimensionally reduced space. Upon selection of a data point in the dimensionally reduced space, the data point information is populated in section 604, for example, the data object information shown is for selected data point 608. The data object information in section 604 can either be altered in accordance with forward projection (discussed above) or the selected data point can be dragged around the dimensionally reduced space in accordance with backward projection (discussed above). In section 606, the original information for the select data point is shown.

In addition, FIG. 6 shows the prolines for selected data point 608. The small circle 612 indicates the position that the selected data point 608 would assume if it had a numerical feature value corresponding to the mean of its distribution, whereas the larger circle 610 corresponds to the new position of the data point if moved according to alteration made by the data analyst. Similarly, the two segments of the arrow 614a, 614b indicate a variation of one standard deviation ($\sigma i$) from the mean ($\mu i$). The segment identified by the range [$\mu i$ $\sigma i$, $xi+\sigma i$] is highlighted and further divided into two segments. The portion of the segment to the left of the larger circle 610 shows the positions that the data point would assume by increasing its numerical feature value, whereas the segment to the right of the larger circle 610 indicates a decreasing value. Furthermore, each one of lines 620 represents the proline for a different numerical feature of selected data point 608. For backward projection, shaded area 618 represents an area where a data point is dragged to a position that does not satisfy a constraint. If the data analyst drops selected data point 608 in an infeasible position, the point is automatically moved through animation back to the last feasible position to which it was dragged.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for enhanced exploration of dimensionally reduced data, the method comprising:
    obtaining at least one data set having a plurality of data objects, wherein each data object is characterized by a plurality of numerical features;
    applying a dimensionality reduction technique to the at least one data set;
    generating a two-dimensional scatter plot of the at least one data set, wherein each data object in the plurality of data objects corresponds to a data point in a plurality of data points in the two-dimensional scatter plot;
    selecting a data point for a projection line in the plurality of data points in the two dimensional scatter plot;
    generating a projection line for each numerical feature of the data object corresponding to the data point for the projection line, wherein a length of the projection line indicates an importance of each numerical feature on the position of the data point, and wherein generating a projection line for each numerical feature of the data object comprises:
    calculating the mean, standard deviation, minimum value and maximum value for each numerical feature; and
    plotting the projection line;
    altering at least one numerical feature of a data object in the plurality of data objects, wherein a position of the data point for the projection line corresponding to the data object is affected in real-time,
    and wherein remaining data points in the plurality of data points are unaffected.

2. The method of claim 1, wherein plotting the projection line, further comprises:
    plotting the projection line with a range from the minimum value to the maximum value and a step size of $c\sigma_i$.

3. The method of claim 2, wherein applying a dimensionality reduction technique to the at least one data set is via principal component analysis.

4. The method of claim 2, wherein applying a dimensionality reduction technique to the at least one data set is via linear discriminant analysis.

5. The method of claim 2, wherein applying a dimensionality reduction technique to the at least one data set is via generalized discriminant analysis.

6. The method of claim 2, wherein applying a dimensionality reduction technique to the at least one data set is via an autoencoder based dimensionality reduction.

7. A method for enhanced exploration of dimensionally reduced data, the method comprising:
    obtaining at least one data set having a plurality of data objects, wherein each data object is characterized by a plurality of numerical features;
    applying a dimensionality reduction technique to the at least one data set;
    generating a two-dimensional scatter plot of the at least one data set, wherein each data object in the plurality of data objects corresponds to a data point in a plurality of data points in the two-dimensional scatter plot;
    selecting a constrained data point in the plurality of data points in the two-dimensional scatter plot;
    setting a constraint on at least one numerical feature of the data object corresponding to the constrained data point;
    generating a shaded area in the two-dimensional scatter plot that would not maintain the constraint on the at least one numerical feature;
    altering the position of at least one data point in the plurality of data points in the two-dimensional scatter plot, wherein at least one numerical feature of the data object corresponding to the at least one data point is affected in real time,
    and wherein remaining data points in the plurality of data points are unaffected.

8. The method of claim 7, wherein applying a dimensionality reduction technique to the at least one data set is via principal component analysis.

9. The method of claim 7, wherein applying a dimensionality reduction technique to the at least one data set is via linear discriminant analysis.

10. The method of claim 7, wherein applying a dimensionality reduction technique to the at least one data set is via generalized discriminant analysis.

11. The method of claim 7, wherein applying a dimensionality reduction technique to the at least one data set is via an autoencoder based dimensionality reduction.

12. A computer program product for enhanced exploration of dimensionally reduced data, the computer program product comprising a computer usable storage medium having program instructions embodied therewith, wherein the readable storage medium is not a transitory signal per se, the program instruction executable by a computer to cause the computer to perform a method comprising:
   obtaining at least one data set having a plurality of data objects, wherein each data object is characterized by a plurality of numerical features;
   applying a dimensionality reduction technique to the at least one data set;
   generating a two-dimensional scatter plot of the at least one data set, wherein each data object in the plurality of data objects corresponds to a data point in a plurality of data points in the two-dimensional scatter plot;
   selecting a data point for a projection line in the plurality of data points in the two dimensional scatter plot;
   generating a projection line for each numerical feature of the data object corresponding to the data point for the projection line, wherein a length of the projection line indicates an importance of each numerical feature on the position of the data point, and wherein generating the projection line for each numerical feature of the data object comprises:
   calculating the mean, standard deviation, minimum value and maximum value for each numerical feature; and
   plotting the projection line;
   altering at least one numerical feature of a data object in the plurality of data objects, wherein a position of the data point for the projection line corresponding to the data object is affected in real-time,
   and wherein remaining data points in the plurality of data points are unaffected.

13. The computer program product of claim 12, wherein plotting the projection line, further comprises:
   plotting the projection line with a range from the minimum value to the maximum value and a step size of $c\sigma_i$.

14. The computer program product of claim 12, wherein applying a dimensionality reduction technique to the at least one data set is via principal component analysis.

15. The computer program product of claim 12, wherein applying a dimensionality reduction technique to the at least one data set is via linear discriminant analysis.

16. The computer program product of claim 12, wherein applying a dimensionality reduction technique to the at least one data set is via generalized discriminant analysis.

17. The computer program product of claim 12, wherein applying a dimensionality reduction technique to the at least one data set is via an autoencoder based dimensionality reduction.

* * * * *